(12) United States Patent
Avril et al.

(10) Patent No.: US 9,362,012 B2
(45) Date of Patent: Jun. 7, 2016

(54) PACKAGING OF RADIOACTIVE WASTE BY CEMENTING

(71) Applicant: AREVA NC, Courbevoie (FR)

(72) Inventors: Damien Avril, Cherbourg-Octeville (FR); David Chartier, Point-Saint-Esprit (FR); Jennifer Sanchez-Canet, Pont-Saint-Esprit (FR)

(73) Assignee: Aveva NC, Courbevoie (FR)

( * ) Notice: Subject to any disclaimer, the term of this patent is extended or adjusted under 35 U.S.C. 154(b) by 45 days.

(21) Appl. No.: 14/367,783

(22) PCT Filed: Dec. 20, 2012

(86) PCT No.: PCT/EP2012/076388
§ 371 (c)(1),
(2) Date: Jun. 20, 2014

(87) PCT Pub. No.: WO2013/092866
PCT Pub. Date: Jun. 27, 2013

(65) Prior Publication Data
US 2015/0053902 A1    Feb. 26, 2015

(51) Int. Cl.
*G21F 9/16* (2006.01)
*G21F 9/30* (2006.01)
*C04B 28/02* (2006.01)
*C04B 28/08* (2006.01)
*C04B 14/06* (2006.01)
*C04B 14/00* (2006.01)
*C04B 103/00* (2006.01)
*C04B 111/00* (2006.01)

(52) U.S. Cl.
CPC ............... *G21F 9/304* (2013.01); *C04B 14/00* (2013.01); *C04B 14/06* (2013.01); *C04B 28/02* (2013.01); *C04B 28/08* (2013.01); *C04B 2103/0089* (2013.01); *C04B 2111/00862* (2013.01); *Y02W 30/91* (2015.05)

(58) Field of Classification Search
CPC ............... G21F 9/00; G21F 9/16; B09B 3/00; C02F 11/00; C03B 5/00; C03B 5/027
USPC ........................................ 588/3, 14, 252, 410
See application file for complete search history.

(56) References Cited

U.S. PATENT DOCUMENTS

| 4,904,416 A | 2/1990 | Sudo et al. |
| 4,906,408 A | 3/1990 | Bouniol |

FOREIGN PATENT DOCUMENTS

| EP | 0 319 398 A1 | 6/1989 |
| JP | 63-243798 A | 10/1988 |

OTHER PUBLICATIONS

Dunzik Cougar et al., "A Novel Waste Form for Disposal of Spent-Nuclear-Fuel Reprocessing Waste: A Vitrifiable Cement". XP-000800848, vol. 25 , No. 1, Jan. 1, 1999, pp. 93-103.
Sharp et al., "Cementitious Systems for Encapsulation of Intermediate Level Waste". XA-002680333, Proceedings of ICEM 03, Sep. 25, 2003, pp. 1-10.
International Search Report for International Application No. PCT/EP2012/076388 , date of mailing Nov. 4, 2013.
French Search Report for French Application No. 116228, date of mailing Sep. 18, 2012.
Sandor Popovics, "Concrete Materials". XP002680331, Noyes Publications, 1992, pp. 221.
US Silica, "Datasheet Min-U-Sil 30". XP00260332, URL:http://www.ussilica.com/uploads/files/product-data-sheets/industry/building-products/MINUSIL30-Pacific, Sep. 10, 2007.

*Primary Examiner* — Edward Johnson
(74) *Attorney, Agent, or Firm* — Miles & Stockbridge P.C.

(57) ABSTRACT

Using crystalline silica, mixed with cement powder, to reduce the heating of the cement paste caused by the hydration of said powder, during a process of packaging of radioactive waste, a formulation for the packaging of radioactive waste by cementing, which comprises such silica, a method for packaging radioactive waste implementing this formulation, and a package for packaging of radioactive waste which is obtained by this method.

20 Claims, 3 Drawing Sheets

PACKAGING OF RADIOACTIVE WASTE BY CEMENTING

TECHNICAL FIELD

The invention relates to the field of packaging of radioactive waste by cementing.

More specifically, the invention relates to the use of crystalline silica, mixed with cement powder, to reduce the heating of the cement paste caused by the hydration of said powder, during a process of packaging of radioactive waste.

The invention also relates to a formulation for the packaging of radioactive waste by cementing, which comprises such silica.

It also relates to a method for packaging radioactive waste implementing said formulation, and to a package for packaging of radioactive waste which is obtained by this method.

The invention particularly finds application in the processing of waste produced downstream of the nuclear fuel cycle and, in particular, low- and medium-activity waste such as:
- ion exchange resins (or IER) used for the processing of effluents or the treatment of water from pools for discharging, cooling or storing irradiated nuclear fuel assemblies;
- shearing fines;
- dissolution fines derived from the processing of said assemblies.

STATE OF THE PRIOR ART

For many years, radioactive wastes have been packaged in the form of packages, in which they are retained in successive envelopes of material, these envelopes preventing the dispersion of said radioactive species into the environment.

Thus, the transport, the storage and the disposal of said packages are facilitated and may be carried out in complete safety, while assuring the protection of operators vis-à-vis the radiation emitted by said wastes.

Among the radioactive wastes subject to packaging are particularly included IER, shearing fines and dissolution fines.

IER chemically take the form of polymers functionalized in a different manner depending on the affinity of said resins. Said functionalization involves a polystyrene backbone cross-linked by vinyl benzene provided with functional groups, of sulfonic type for cationic resins, and of quaternary ammonium type as regards anionic resins. The irradiation of said resins is responsible for the partial alteration of said molecular edifices.

Cementing is a method routinely retained for the packaging of IER or waste comprising IER.

This consists in forming a solid structure, or "coated waste", by hardening of a formulation comprising the waste and a cement matrix intended to envelop it. Then, a package for packaging, which consists after sealing of a drum in which said coated waste is formed, may be stored and/or disposed of.

Nevertheless, several factors contribute to the progressive degradation of the coated waste.

For instance, the formulation comprising the waste and the cement matrix can harden, for example during mixing of said formulation, as the amount of resins intended to be incorporated therein increases.

Once the coated waste has been constituted, important variations in temperature and humidity can also lead to an expansion of said coated waste, or even its fissuring. Moreover, the mechanical strength thereof decreases as the rate of incorporation of IER increases in the cement matrix.

Finally, the resins themselves, due to the nature of the radionuclides that they contain, have sufficiently high chemical reactivity to contribute to this degradation.

The perspective of the long term management of radioactive waste has made necessary the development of techniques aiming to improve the resistance of the cement matrix, and, hence, the level of protection over time conferred by the packages for packaging.

A certain number of techniques are known aiming to reduce the degradation of a cement matrix dedicated to the packaging of IER, and to offset the fragility of the coated waste that is involved in said degradation. These techniques focus on the deleterious role of resins on the cement matrix.

Thus, for example, patent application EP 0 319 398 [1] proposes mixing a radioactive waste containing IER rich in borate ions, in the presence of water, with aluminous cement, non-aluminous cement and optionally a silicon compound and/or a compound containing boron, in proportions such that a mixture is formed that constitutes, around the waste, a solid matrix comprising a stable mineral phase of straetlingite type. It is explained that said mixture makes it possible to avoid harmful chemical interactions between said waste and the cement or water.

U.S. Pat. No. 4,904,416 [2], which aims to resolve a substantially identical technical problem, proposes eliminating free water from the IER, then mixing the dry resins thereby obtained with a small amount of cement. It is explained therein that the cement powder reacts with the water that adheres to the surface of the resin particles or that is contained in said particles. Moreover, the hydration of the cement, that results therefrom, leads to a progressive covering of the particles by the cement paste thereby formed. This pre-processing makes it possible to avoid mechanisms behind the expansion of the coated waste taking place during its immersion in water, and, hence, to increase the IER content of the coated waste.

At an industrial scale, another method for packaging waste comprising IER by cementing is currently implemented, in particular in the La Hague (France) spent nuclear fuel processing plant. Said method, known as the "ACR method", enables the formation of a package for packaging of a volume of 400 liters.

In order to lower the reactivity of the IER, said method also involves chemical pre-processing of the these IER, but by an aqueous solution of slaked lime $Ca(OH)_2$ and of tetrahydrated calcium nitrate $Ca(NO_3)_2.4H_2O$ able to saturate the anionic and cationic sites of the resins. Moreover, the action of the slaked lime makes it possible to neutralise the protons released by ion exchange with the IER.

Then, the hardening of a formulation comprising among other things waste, water, slaked lime, tetrahydrated calcium nitrate and cement powder enables the constitution of a coated waste.

Nevertheless, there exists a necessity of treating the pre-processing solution after its use, this being able to prove difficult particularly on account of the volume of solution involved.

Moreover, the formulation implemented in the ACR method has been optimized for packaging of waste by cementing, in the form of a package of a maximum volume of 400 liters. This formulation thus cannot be used as such for a significantly greater volume of waste.

The inventors have thus set themselves the general aim of developing a method for designing a package for packaging radioactive waste, making it possible to reduce the risks of degradation of the cement matrix and, hence, the coated waste, whether it is initiated by the constituents of the waste and/or of the cement matrix.

The inventors have set themselves the aim of developing a package enabling the packaging of a volume of waste greater than that of the packages obtained by the implementation of currently existing methods.

It turns out that, in the scope of their works, the inventors have observed that excessive heating of the cement paste, this cement paste being obtained during the hydration of the cement powder and constituting the base of the cement matrix, is capable, if not correctly controlled, of leading to fissuring of said matrix and, hence, to fissuring of the coated waste.

Moreover, the inventors have observed that this heating may be reduced by the addition, to the cement paste, of silicon oxide in crystalline form, taking the form of particles having particular particle size characteristics.

And it is on these observations that the present invention is based.

DESCRIPTION OF THE INVENTION

The subject-matter of the invention is thus, firstly, the use of silicon dioxide, also known as "silica" or designated by its chemical formula $SiO_2$, in a crystalline form, which takes the form of particles of which at least 90% by number have an average particle size ranging from 0.5 to 200 µm, mixed with cement powder, to reduce the heating of the cement paste caused by the hydration of said powder, during a process for packaging of radioactive waste by cementing.

Preferentially, at least 90% by number of the particles of silicon dioxide have an average particle size ranging from 1 to 100 µm.

This effect of reduction of heating by resorting to such a chemical compound has never been described, to the knowledge of the inventors, in the prior art. Moreover, it confers to the cement matrix enveloping the waste comprising IER a very satisfactory stability and, hence, quite particular interest in the field of packaging of radioactive waste by cementing.

The inventors have been able to demonstrate such an effect by an approach combining the results of calorimetric tests carried out according to the NF P15-436 standard, and those derived from thermal modelling following said tests.

For example, the proportions of the crystalline silicon dioxide and of the cement powder in the mixture represent a parameter of choice, particularly in terms of cost.

Thus, advantageously, the silicon dioxide and the cement powder are present, in the mixture, in respective proportions by mass of (17±3)% and (83±3)% of the total mass of said mixture.

Further, several crystalline forms of silica are known depending on the temperature and the crystallisation pressure thereof.

Thus, by increasing order of melting temperature, the polymorphous forms of silica are stishovite, quartz (in its α and β allotropic forms), tridymite (in its α, β and γ allotropic forms), calcedoine and cristobalite (in its α and β allotropic forms). In particular, the silicon dioxide is quartz.

The use of crystalline silicon dioxide, preferentially in a particular crystalline form, has enabled the development of a particular formulation, which enables the packaging of radioactive waste by cementing.

The subject-matter of the invention is thus also a formulation for the packaging of radioactive waste by cementing, which comprises the following components:

(11.0±3.3)% by dry mass of radioactive waste;
(35.5±4.0)% by mass of water;
(44.0±5.0)% by mass of cement powder; and
(9.5±3.1)% by mass of silicon dioxide in crystalline form, which takes the form of particles of which at least 90% by number have an average particle size ranging from 0.5 to 200 µm.

According to the invention, the radioactive waste comprised in said formulation is selected from ion exchange resins, shearing fines, dissolution fines and mixtures thereof.

The IER, the molecular structure of which has been explained previously, may be one or several types of resins, independently of the fact that they are anionic and/or cationic.

In particular, said resins take the form of a plurality of particles of which at least 90% by number have an average particle size ranging from 5 to 130 µm.

The formulation according to the invention also comprises water, which, in a preferred manner, is provided by the waste, particularly in the case where said waste comprises or consists of IER. In fact, these IER retain a certain amount of water within the scope of their use, for example, in nuclear facilities, during operations of filtration of the water used for cooling nuclear fuel assemblies after their irradiation in the reactor.

Nevertheless, it is also possible that all or part of the water comprised in the formulation is from an external input.

Shearing fines, which have been presented above, are metal residues generated during operations of cutting or shearing of fuel claddings, said operations having the objective of releasing the nuclear materials contained in the claddings, with a view to their dissolution and their subsequent processing.

Said shearing fines generally comprise a metal such as a zirconium based alloy, for example zircaloy, or a stainless steel.

Moreover, said residues take, preferably, the form of a plurality of particles of which at least 90% by number have an average particle size greater than or equal to 45 µm.

Dissolution fines are, for their part, insoluble compounds derived from fuel dissolution operations, for example carried out in nitric acid.

The chemical nature of said dissolution fines is highly diverse. They may for example be precipitates of fission products, intermetallic compounds, or instead plutonium rich phases.

Generally, said dissolution fines comprise one or more elements selected from molybdenum, palladium, plutonium, ruthenium, technetium, rhodium, silver and mixtures thereof. Thus, among the species contained in dissolution fines comprising plutonium, may be cited oxide of plutonium(IV), of formula $PuO_2$, or intermetallic compounds, for example those of formulas $UPuPd_3$ and $UPuRh_3$.

Furthermore, dissolution fines take, preferentially, the form of a plurality of particles of which at least 90% by number have an average particle size less than or equal to 210 µm.

In addition, and preferentially, it is pointed out that the radioactive waste comprised in the formulation according to the invention comprises a majority mass proportion of IER.

Thus, preferentially, the mass proportions of IER, when they are considered dry, of shearing fines and of dissolution fines within the waste represent respectively (81.3±1.5)%, (1.9±1.5)% and (16.8±1.5)% of the total mass of said waste.

The formulation according to the invention also comprises cement powder, the cement being preferably blast furnace cement, also known as CEM III cement and, better still, class C blast furnace cement, also noted CEM III/C.

Another component of this formulation is silicon dioxide in crystalline form, which takes the form of particles of which at least 90% by number have an average particle size ranging from 0.5 to 200 μm.

Here also, advantageously, the silicon dioxide is quartz.

Furthermore, the formulation according to the invention may comprise in addition one or more adjuvants, such as those conventionally used in the preparation of cements.

In particular, one of said adjuvants may be a fluidizing agent, the added volume of which depends on the rheology of said formulation. Thus, preferentially, the fluidizing agent does not represent more than 5% by mass of the mass of cement powder.

More ample information concerning said fluidizing agent is provided in the remainder of the description.

The formation of this formulation is a step prior to the packaging of radioactive waste by cementing.

The subject-matter of the invention is also a method for packaging radioactive waste by cementing, which comprises:

a) mixing, in a container, the components of a formulation as defined above until a homogenous mixture is obtained; and b) hardening the mixture obtained at step a).

In the case particularly where the radioactive waste contains IER, step a) comprises preferentially:

$a_1$) pre-processing the radioactive waste by mixing said waste in humid form, with a fraction of the cement powder and a fraction of the silicon dioxide; and $a_2$) mixing the radioactive waste thereby pre-processed with the remaining fractions of cement powder and of silicon dioxide.

The expression "waste in humid form" designates radioactive waste in which the humidity comes either from the water retained by the waste, or water coming from an external input, or both.

Step $a_1$) has the advantage of using, as one of the pre-processing reagents, a cement, introduced in the form of a powder, the cement also being the main constituent of the cement matrix having for aim to envelop the waste.

Preferably, and in the same way as detailed above, a cement in the form of a powder is used, the cement being preferably blast furnace cement, also known as CEM III cement and, better still, class C blast furnace cement.

The choice of the use of said cement powder in the pre-processing thus makes it possible to limit the amount of reagents introduced during the implementation of the method according to the invention.

The principle of pre-processing consists in saturating the anionic and cationic sites of the IER by the ions released during the hydration of the cement powder by the water retained by the IER, said ions being mainly calcium, potassium, sodium, sulphate and dihydrogen silicate ions, of respective formulas $Ca^{2+}$, $K^+$, $Na^+$, $SO_4^{2-}$ and $H_2SiO_4^{2-}$, with the aim of limiting the risks of degradation of the cement matrix intended to envelop the waste.

The other reagent used in step $a_1$) of pre-processing is silicon dioxide in crystalline form, introduced in the form of particles of which at least 90% by number have an average particle size ranging from 0.5 to 200 μm.

In particular, at least 90% by number of particles of silicon dioxide in crystalline form have an average particle size ranging from 1 to 100 μm.

Furthermore, the silicon dioxide is preferentially quartz.

Adjustment of parameters such as the duration of the pre-processing may be made by those skilled in the art. Said duration must particularly be sufficient to enable the return to ambient temperature of the formulation according to the invention, when heating is generated by acid-basic reaction between the ions released by the IER and those released by the cement powder during its hydration.

The same is true when it involves determining the fraction of components of the formulation that is involved in step $a_1$) of pre-processing.

Said fraction may be low, particularly for chemical reasons, given that the large amount of ions released by the hydration of a small amount of cement powder is considered as sufficient for the saturation of the free ionic sites of said resins.

In particular, a mass fraction of (20±5)% of the total mass of cement powder, and a mass fraction of (20±5)% of the total mass of silicon dioxide are used at step $a_1$).

Step a) of the method according to the invention also comprises, advantageously, a step $a_2$) of mixing the radioactive waste thereby pre-processed with the remaining fractions of cement powder and of silicon dioxide.

Depending on the rheology of the mixture obtained at step $a_2$) of this method, the formulation comprises one or more adjuvants, such as those used conventionally in the preparation of cements, and said adjuvant(s) is(are) added to the mixture obtained at step $a_2$).

In particular, one of said adjuvants may be a fluidizing agent, the volume of which is also determined as a function of the aforementioned rheology.

Typically, fluidizing agents are compositions having plastifying and water reducing properties. They do not modify the water content of the medium in which they are introduced and make it possible, moreover, to obtain cement pastes that have appreciable workability and appreciable resistance.

As an example, that which is marketed by the firm BASF under the tradename Pozzolith™ 400 N may be cited.

In the case where resort is made to the addition of a fluidizing agent, this does not represent more than 5% by mass of the mass of cement powder.

Advantageously, the mixture obtained at the end of step a) has a ratio by mass of water to cement powder equal to (0.81±0.10).

The method according to the invention also comprises a step b) of hardening of the mixture obtained at step a).

The hardening of said mixture, which is also known as "coated waste", may be carried out, for example, by storage thereof at ambient temperature in a medium in which the hygrometry is controlled.

Furthermore, the homogenisation of the different constituents entering into the composition of the coated waste, which is carried out throughout steps a) and b) of the method according to the invention, also constitutes an important aspect of the implementation of this method.

This homogenisation must be carried out efficiently to enable, particularly, the re-suspension of particles of which the average size does not exceed one millimeter.

Such devices are known to those skilled in the art wishing to implement such a method for packaging radioactive waste, for example a mechanical stirring device comprising a motor, a central drive axis to which is(are) connected one or more rotating paddles of variable geometry.

Preferably, the paddle(s) is(are) designed in a highly resistant metal material, for example in black steel, in other words a steel passivated on the surface by creation of a metal oxide layer, of black colour, during its hot manufacture.

Also preferably, the method according to the invention is a lost paddle method, this also signifying that the rotating paddle(s) is(are) separated from the mechanical stirring device, at the end of the implementation of said method, and remain(s) integral with the coated waste, once it has been constituted.

Furthermore, for obvious reasons of limited manageability of the coated waste assuring the confinement of the radioactive waste, the container in which the steps of the method have been carried out also serves as drum for packaging the radioactive waste.

The implementation of said method, which involves a formulation as explained above, enables the constitution of a structure for packaging of radioactive waste that may be used for the storage of this radioactive waste.

Thus, the final subject-matter of the invention is a package for packaging of radioactive waste, which is obtained by a method as defined previously.

In particular, said package for packaging comprises a packaging drum and a coated waste as defined previously.

As has been explained, said packaging drum is also, preferentially, the container in which the steps of the method according to the invention have been carried out. Thus, said package is obtained by hermetic sealing of the packaging drum containing the coated waste.

Moreover, the package according to the invention has, advantageously, a volume greater than 500 liters and, better still, of 1000 to 1200 liters, said volume being typically 1100 liters.

"Volume" of the package is taken to mean the maximum filling volume of the drum used for packaging the radioactive waste, this having been subject beforehand to cementing by implementation of the method explained previously.

Finally, just like the rotating paddles that have been described above, the drum is most often designed in a highly resistant metal material, for example in black steel.

The invention has numerous advantages.

In fact, it makes it possible to produce a package for packaging of radioactive waste that is durable over time, through a method comprising pre-processing of waste comprising IER with a small amount of cement powder, in order to neutralise the radionuclides retained by these resins.

Said cement powder is then used mixed with particles of crystalline silicon dioxide, these particles making it possible to reduce the heating generated within the cement paste obtained by hydration of the cement powder and, hence, to improve the cohesion and the lifetime of the package.

Moreover, it makes it possible to produce a package for packaging of a relatively large volume, typically of 1100 liters, said volume being novel, in the current state of knowledge of the inventors, in the field of packaging of radioactive waste.

Other characteristics and advantages of the invention will become clearer from the description complement that follows, which relates to a study of the properties of reducing the heating of the cement paste caused by the hydration of the cement powder, by standardised calorimetry tests and thermal modelling, and to an example of implementation of the method and to an example of embodiment of a package for packaging according to the invention, this description complement referring to the appended figures.

It goes without saying that these examples are only given by way of illustration of the subject-matters of the invention and do not constitute in any case a limitation of said subject-matters.

DETAILED DESCRIPTION OF THE PARTICULAR EMBODIMENT

Introductory Section: Calorimetry Measurements and Thermal Modelling of Heating During Hydration of a CEM III/C Cement A preparatory study, having for objective the determination of the thermal behaviour of CEM III/C cement powder during its hydration, has been carried out.

This preparatory study involved:
firstly, Langavant calorimetry measurements, which are standardised and thus carried out at a reference operating temperature;
secondly, computer aided thermal modelling from the results obtained during these measurements, in order to determine the thermal behaviour of said cement at different operating temperatures.

1. Calorimetry Measurements 1.1. Principle of the Method

The method firstly implemented in this study, governed by the NF P 15-436 standard, makes it possible to measure the heat of hydration of cement powders by semi-adiabatic calorimetry.

This method is also known as the "Langavant calorimeter method".

Figure 1:
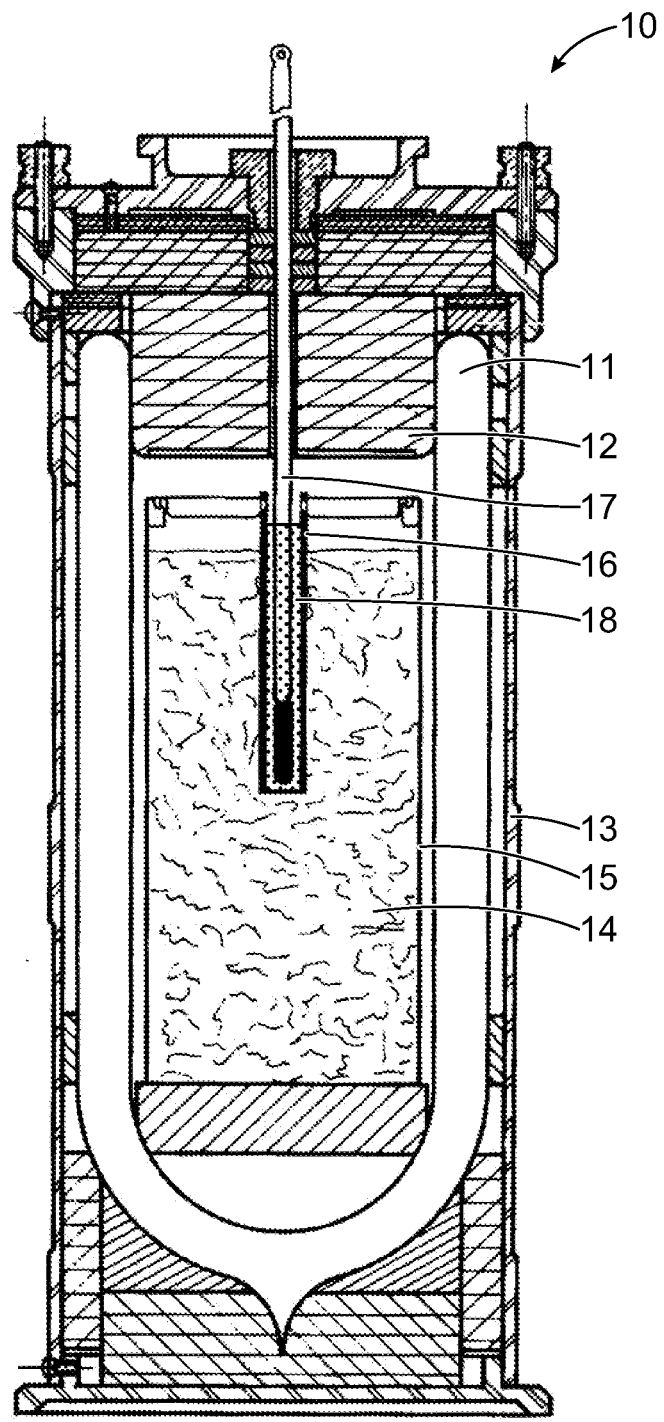
FIG. 1 is a representation of the device used for the calorimetry tests carried out according to the NF P 15-436 standard.

The measurements are carried out using a Langavant calorimeter, as illustrated in FIG. 1. This calorimeter takes the form of a device 10 composed of a Dewar flask 11 sealed with an insulated stopper 12 and contained in a rigid envelope 13.

The aforementioned method consists in taking a sample 14 of a formulation such as that of the invention, just after mixing.

Said sample 14 is introduced into a cylindrical container 15 closed in a sealed manner and provided with a pocket 16 enabling the introduction of a device 17 making it possible to monitor the temperature, for example a thermometer or a thermocouple.

A heat-transfer fluid 18, for example oil, is introduced beforehand inside said pocket, with the aim of improving heat transfer to the thermocouple. The assembly is placed in the calorimeter 10.

Two principles are implemented in this method.

In fact, the evolution of the temperature inside the container 15 makes it possible to evaluate the amount of heat released.

Moreover, at a given time period, the heat of hydration of the cement powder contained in the sample 14 is equal to the sum of the heat accumulated in the Dewar flask 11, and of the heat dissipated to the surrounding medium from the initial instant.

1.2. Comparative Test of the ACR Formulation and of that According to the Invention A comparative study is carried out in order to study heating of the formulation implemented in the ACR method and of that according to the invention, during the hydration of CEM III/C cement powders contained in each of said formulations.

The composition by mass of said formulations is reported in Table 1.

TABLE 1

|  | ACR formulation % by mass | Invention formulation % by mass |
|---|---|---|
| Dry waste | 9.5 | 11.0 |
| Water | 32.5 | 35.5 |
| $Ca(NO_3)_2 \cdot 4H_2O$ | 4.2 | — |
| $Ca(OH)_2$ | 2.8 | — |
| Crystalline $SiO_2$ | — | 9.5 |
| CEM III/C | 51.0 | 44.0 |
| Fluidizing agent | yes | yes |

The tests are carried out in a calorimeter placed in a constant (thermostat) 20° C. temperature environment, by taking a sample of each of the evaluated formulations, these formulations being prepared in two drums each with a capacity of 200 liters.

Figure 2:
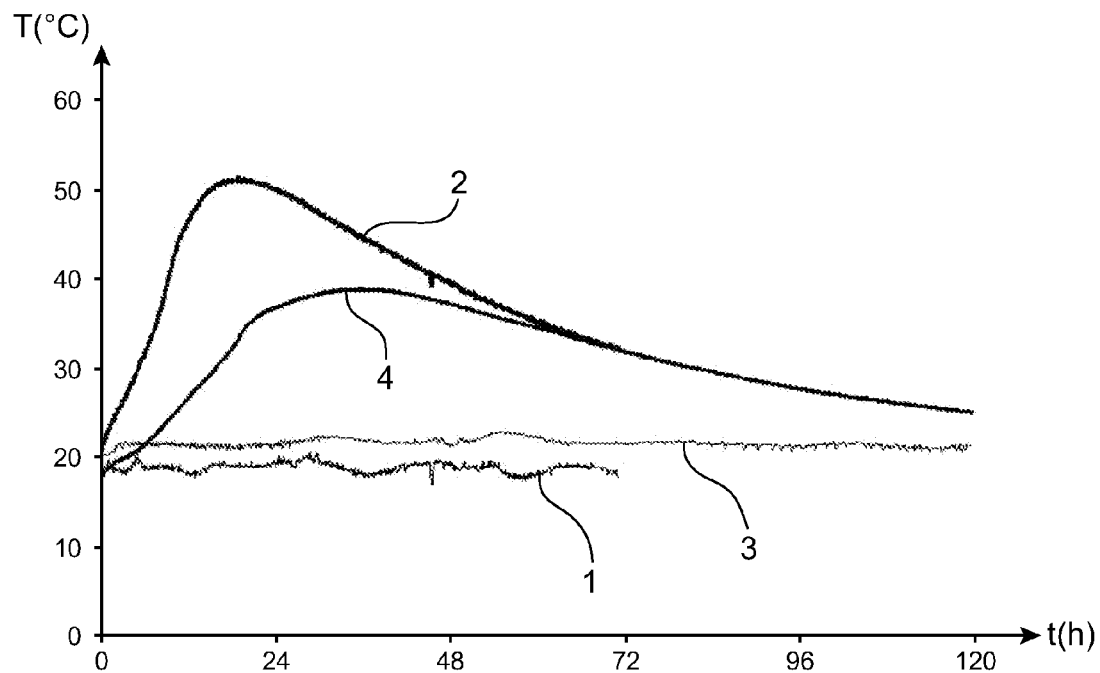
FIG. 2 represents the comparative evolution of temperatures, noted T, measured inside a calorimeter used during standardised tests as a function of time, noted t, for formulations such as that implemented in the ACR method and that according to the invention.

FIG. 2 shows the evolution of the temperature inside the calorimeter as a function of time, for each of the evaluated formulations.

In this figure, curves 1 and 3 express the evolution of the temperature of the environment in which the calorimeter is placed, said temperature remaining substantially equal to 20° C. throughout the measurements.

Curves 2 and 4 represent, for their part, the evolution of the temperature inside the measurement containers placed inside the calorimeter, respectively for the ACR formulation and for that according to the invention.

A clear decrease in the heating may be noted by the use of a formulation according to the invention. In fact, the maximum temperature reached within said formulation is below 40° C. (curve 4), whereas that reached within the ACR formulation slightly exceeds 50° C. (curve 2).

2. Thermal Modelling

The second preparatory step consists in modelling based on the results obtained during standardised calorimetric tests explained previously carried out in an environment where the temperature is stabilised at a reference operating temperature (20° C.) by thermostat.

This makes it possible to determine the thermal behaviour of the formulation according to the invention during the hydration of the cement powder, and this holds at operating temperatures different to said reference operating temperature, but also in the presence of different volumes of coated waste.

2.1. Methodology Employed

The method retained is based on the exploitation of a heat transfer knowledge model, developed using version 2006.5 of the differential-algebraic solver Aspen Custom Modeler™.

This model represents the transitory thermal behaviour of a formulation according to the invention, during the hydration of the cement powder, within a drum in which the coated waste is constituted.

The approach retained is based on the following steps:
  estimation of the law of evolution of the heat of hydration by mass of cement powders during the hydration reaction thereof, on the basis of the calorimetric tests explained above, at a temperature stabilised at 20° C. by thermostat;
  implementation of the law of evolution of the heat of hydration by mass of said cement powders in the model, for the transitory thermal behaviour of the formulation according to the invention during the hydration of the cement powder;
  validation of the model by comparison with the experimental data obtained on 200 liter and 1100 liter drums at a temperature stabilised at 20° C. by thermostat; and
  extrapolation to a drum of 1100 liters, said drum being placed in an environment where the temperature is stabilised at 30° C., and comparison with a thermal criterion, according to which it is normal to consider that no damage affects the coated waste when the maximum temperature reached during the manufacture of said coated waste is below 80° C.

The physical phenomena taken into account for the modelling are the following:
  thermal conduction: radial and vertical in the cement, radial in the wall of the drum;
  heat release due to the heat of hydration of the cement;
  radiation: between the outer side wall of the drum and the exterior environment, but also between the upper surface of the cement and the exterior environment; and
  natural convection: between the outer side wall of the drum and ambient air, but also between the upper surface of the cement and ambient air.

2.2. Modelling Results

The approach followed in the modelling has the objective of simulating the thermal behaviour of the formulation according to the invention during the hydration of the cement powder, said formulation being contained in a 1100 liter drum, itself placed in an environment where the temperature is stabilised at 30° C.

A difference is nevertheless to be noted, according to which the waste taken into account in said modelling is exclusively constituted of dissolution fines, these having been identified by the inventors as the constituent of the radioactive waste actually used which is the most penalising in terms of heating, prior to said modelling.

Figure 3:
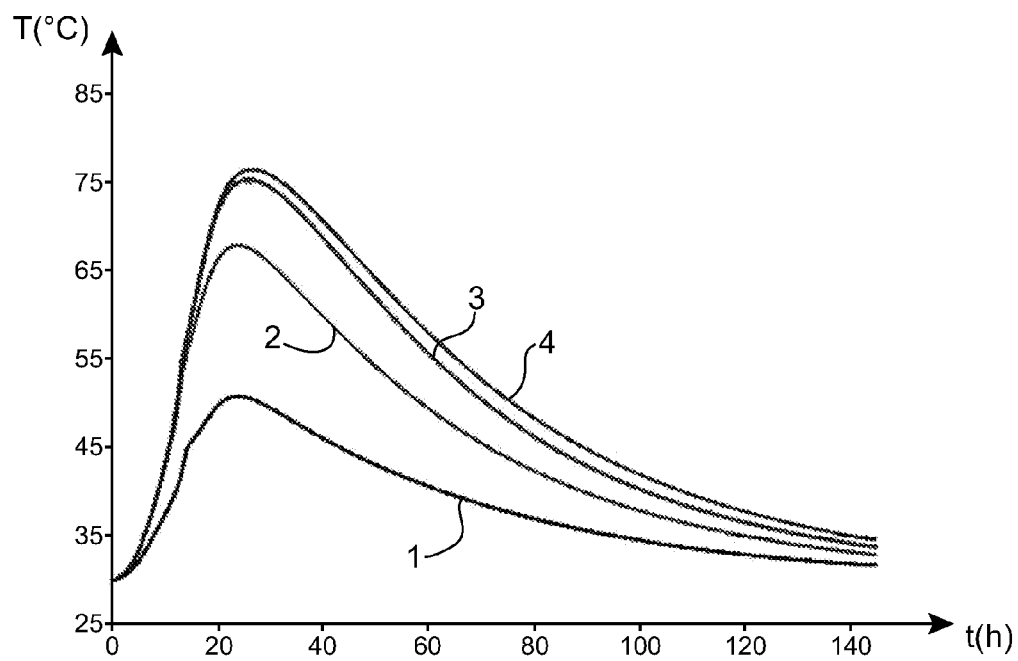
FIG. 3 represents a comparative modelling of temperatures, noted T, within a formulation comprising a waste uniquely composed of dissolution fines, as a function of time, noted t, at various points of said formulation.

Thus, it has been obtained a modelling of the evolution of the temperature at four points of the formulation comprising a waste uniquely composed of dissolution fines, as a function of time, a graphic representation of said evolution being presented in FIG. 3.

The maximum surface and edge temperatures estimated are respectively comprised between 50 and 55° C. (curve 1), and between 65 and 70° C. (curve 2). Said same modelling highlights the maximum core and bottom temperatures, both slightly above 75° C. (curves 3 and 4).

According to the results of this modelling, the thermal criterion set forth in paragraph 2.1. is respected.

Example: Method of Packaging Radioactive Waste and Package for Packaging

This example presents the particular mode of implementation of a method for packaging radioactive waste by cementing according to the invention, and the embodiment of a package for packaging according to the invention.

1. Composition of the Radioactive Waste

Table 2 presents the average breakdown of the constituents of a reference radioactive waste, which is used in a formulation according to the invention, as a function of the nature of the constituents and the size of the particles composing each of said constituents.

TABLE 2

| Constituent | Particle size (μm) | % by mass |
|---|---|---|
| IER | 5-130 | 81.3 |
| Shearing fines | 45-90 | 1.2 |
|  | 200-300 | 0.4 |
|  | 500-1 000 | 0.1 |
|  | >1 000 | 0.2 |
| Dissolution fines | <20 | 5.3 |
|  | 60-80 | 4.6 |
|  | 170-210 | 6.9 |

This reference waste consists of 81.3% by mass of ion exchange resins (IER), of 1.9% by mass of shearing fines, and of 16.8% by mass of dissolution fines.

2. Method for Packaging Radioactive Waste by Cementing

The mode of implementation of the method according to the invention, which is described hereafter, involves a formulation as described in paragraph 1 of this example, comprising a waste in which the IER provide a sufficient amount of water to assure the hydration of the cement powder.

The mass compositions of the waste on the one hand, of the cement matrix on the other hand, are respectively presented in Tables 3 and 4 below.

TABLE 3

| Constituent | Particle size (μm) | Mass (kg) |
|---|---|---|
| IER | 5-130 | 147.5 |
| Shearing fines | 45-90 | 2.2 |
|  | 200-300 | 0.7 |
|  | 500-1 000 | 0.2 |
|  | >1 000 | 0.4 |
| Dissolution fines | <20 | 9.6 |
|  | 60-80 | 8.3 |
|  | 170-210 | 12.5 |

TABLE 4

| Constituent | Mass (kg) |
|---|---|
| Water provided by the waste | 585.8 |
| CEM III/C cement | 726.0 |
| Composition comprising crystalline $SiO_2$ | 156.8 |

The cement matrix comprises water, CEM III/C cement powder marketed by the firm Calcia, and a composition marketed under the qualitative reference Millisil C6 by the firm Sibelco comprising silicon dioxide in crystalline form in a mass percentage typically above 98.6%.

Figure 4:
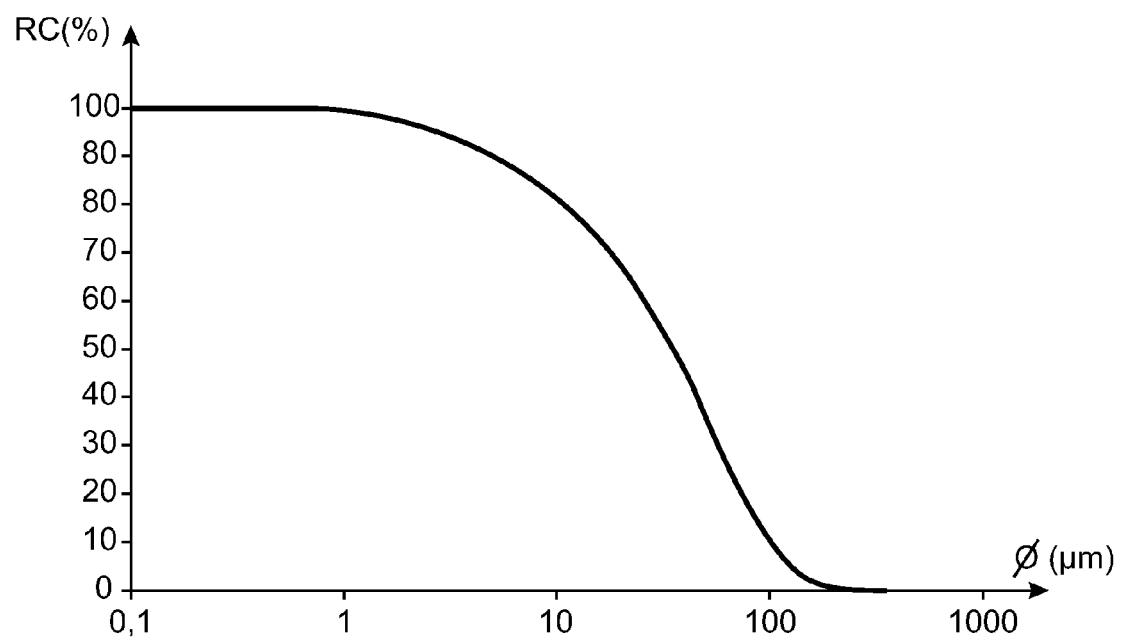
FIG. 4 illustrates the particle size analysis of the composition comprising crystalline silica as used in the particular embodiment of a formulation according to the invention, by representation of the total refusal, noted RC, as a function of the opening, noted Ø.

The particle size analysis of this composition of silicon dioxide, which is carried out by laser particle size analysis using a Mastersizer 2000 (Malvern) device, is represented in FIG. 4.

As may be determined by reading the data of FIG. 4, 10%; 17.5%; 50% and 90% by number of the particles of the composition have respectively sizes greater than 100.7; 90; 35.6 and 5.4 μm.

The components of said formulation are placed in a drum, this also being intended for the packaging of the coated waste obtained by implementation of the method according to the invention.

Table 5 presents the dimensions of a drum for packaging of radioactive waste, the composition of which has just been detailed, as well as the parameters relating to the maximum filling of said drum. The walls of the drum have, moreover, a thickness of 3 millimeters.

TABLE 5

|  | Diameter (mm) | Height (mm) | Volume (L) |
|---|---|---|---|
| Effective volume | 1 024 | 1 469 | 1 210 |
| Maximum filling | 1 024 | 1 336 | 1 100 |

A mechanical stirring device, comprising a drive axis to which a series of paddles is fixed, is intended to assure homogenisation throughout the implementation of the method according to the invention.

According to the implementation mode described here, the method used is the lost paddle method. In addition, it is pointed out that the paddles of the mechanical stirring device and the drum are made of black steel.

A detailed description of the mode of implementation of the method according to the invention figures below.

Firstly, 767.2 kg of humid waste, of which 181.4 kg of waste (dry mass) and 585.8 kg of water retained in part by the IER comprised in said waste, are progressively introduced into the drum while mixing at a speed of 40 revolutions per minute (rpm).

After homogenisation for a duration comprised between 10 and 20 minutes, 20% by mass of the cement powder, i.e. 145.2 kg, and 20% by mass of the $SiO_2$ composition, i.e. 31.4 kg, are added at the same time to the contents of the drum at a rate of around 1 400 kg/h while mixing at a speed of 40 rpm.

At the end of a period of 30 minutes of stirring, the remaining fractions of cement powder and $SiO_2$ composition, said fractions having a total mass of 706.2 kg, are added to the contents of the drum under a negative flow gradient, ranging from 1100 to 900 kg/h depending on the mechanical stresses exerted on the paddles by the formulation thereby constituted, while mixing at a speed of 40 rpm.

Optionally, at the same time, the addition is carried out of one or more adjuvants, for example a fluidizing agent, the added volume of which is determined as a function of the rheology of the formulation obtained.

Such a fluidizing agent is, for example, that marketed under the reference Pozzolith™ 400 N by the firm BASF. This is introduced progressively, by amounts of one liter, in the limit of 5% of the total mass of cement powder involved, i.e. 36.3 kg.

Once the totality of the formulation has been introduced into the drum, it is homogenised for 10 minutes, while mixing at a speed of 50 rpm.

After separating the paddles from the mechanical stirring device, the drum is stored at ambient temperature for hardening of the coated waste thereby constituted.

3. Package for Packaging Obtained

The implementation of the method according to the invention enables the constitution of a package for packaging, said package being formed of a packaging drum and of a coated waste, as described in a detailed manner in paragraph 2 of this example.

The composition by mass of the formulation confined within the package that is obtained is presented in Table 6.

TABLE 6

|  | % by mass |
|---|---|
| Waste (dry mass) | 9.9 |
| Water | 32.0 |
| CEM III/C | 39.6 |
| $SiO_2$ composition | 8.5 |

In order to describe the package for packaging in an exhaustive manner, the following details are added to the data of Table 6:

- these data do not take into account the fluidizing agent that is optionally added, and which is introduced, in the affirmative, in an amount not exceeding 5% of the total mass of cement powder involved, i.e. 36.3 kg (cf. paragraph 2 of the example), it being recalled that said fluidizing agent does not modify the water content of the medium in which it is introduced;
- the formulation has a ratio by mass of water to cement powder equal to 0.81;
- the rate of dry waste contained in the package for packaging according to the invention is equal to 23.7%. Said rate is defined as being the ratio of the mass of dry extract, obtained by heating of a sample of waste representative of the overall waste, at a temperature of 65° C. up to stabilisation of the mass, over the mass of the sample before heating; and
- the maximum filling volume of the drum employed in the package for packaging according to the invention is 1100 liters, as has been detailed in Table 5.

REFERENCES CITED

[1] Patent application EP 0 319 398.
[2] U.S. Pat. No. 4,904,416.

The invention claimed is:

1. A method for reducing heating of a cement paste caused by hydration of a cement powder during a process of packaging radioactive waste by cementing, the method comprising:
    forming a cement mixture by mixing particles of silicon dioxide in crystalline form with the cement powder; and
    reducing heating of said cement mixture caused by hydration of the cement powder during a process of packaging radioactive waste by cementing,
    wherein at least 90% by number of said silicon dioxide particles have an average particle size ranging from 0.5 to 200 μm.

2. The method according to claim 1, wherein at least 90% by number of the particles of silicon dioxide have an average particle size ranging from 1 to 100 μm.

3. The method according to claim 1, wherein silicon dioxide and the cement powder are present in the cement mixture in respective mass proportions of (17±3)% and (83±3)% of the total mass of said cement mixture.

4. The method according to claim 1, wherein the silicon dioxide is quartz.

5. A composition for the packaging of radioactive waste by cementing, the composition comprising:
    (11.0±3.3)% by dry mass of radioactive waste;
    (35.5±4.0)% by mass of water;
    (44.0±5.0)% by mass of cement powder; and
    (9.5±3.1)% by mass of silicon dioxide in crystalline form, which takes the form of particles, at least 90% by number of which have an average particle size ranging from 0.5 to 200 μm.

6. The composition according to claim 5, wherein the radioactive waste is selected from ion exchange resins, shearing fines, dissolution fines, and mixtures thereof.

7. The composition according to claim 5, wherein the cement is a blast furnace cement.

8. The composition according to claim 5, wherein the silicon dioxide is quartz.

9. The composition according to claim 5, further comprising a fluidizing agent.

10. The composition according to claim 9, wherein the fluidizing agent does not represent more than 5% by mass of the mass of cement powder.

11. A method of packaging radioactive waste by cementing, comprising:
    a) mixing, in a container, components of a composition as defined in claim 5 until a homogenous mixture is obtained; and
    b) hardening the mixture obtained at step a).

12. The method according to claim 11, in which step a) further comprises:
    $a_1$) pre-processing the radioactive waste by mixing said radioactive waste in humid form, with a fraction of the cement powder and a fraction of the silicon dioxide; and
    $a_2$) mixing the radioactive waste thereby pre-processed with the remaining fractions of the cement powder and the silicon dioxide.

13. The method according to claim 12, in which a mass fraction of (20±5)% of the total mass of the cement powder, and a mass fraction of (20±5)% of the total mass of the silicon dioxide are used at step $a_1$).

14. The method according to claim 12, in which the composition comprises a fluidizing agent and said fluidizing agent is added to the mixture obtained at step $a_2$).

15. Method according to claim 11, wherein said method is a lost paddle method.

16. The method according to claim 11, in which the container also serves as drum for packaging of the radioactive waste.

17. A package for radioactive waste, said package being obtained by a method as defined in claim 16.

18. The package according to claim 17, wherein said package has a volume above 500 liters.

19. The package according to claim 18, wherein said package has a volume of from 1000 to 1200 liters.

20. The composition according to claim 7, wherein the cement is a class C blast furnace cement.

* * * * *